(12) United States Patent
Grin et al.

(10) Patent No.: US 10,905,263 B2
(45) Date of Patent: Feb. 2, 2021

(54) MIRROR SYSTEMS AND METHODS

(71) Applicant: Kohler Co., Kohler, WI (US)

(72) Inventors: Lawrence A. Grin, Fond du Lac, WI (US); Roger W. Murphy, Kohler, WI (US)

(73) Assignee: Kohler Co., Kohler, WI (US)

( * ) Notice: Subject to any disclaimer, the term of this patent is extended or adjusted under 35 U.S.C. 154(b) by 141 days.

(21) Appl. No.: 16/100,737

(22) Filed: Aug. 10, 2018

(65) Prior Publication Data

US 2019/0053646 A1 Feb. 21, 2019

Related U.S. Application Data

(60) Provisional application No. 62/546,727, filed on Aug. 17, 2017.

(51) Int. Cl.
  *E05D 7/00* (2006.01)
  *A47G 1/24* (2006.01)
  *A47G 1/04* (2006.01)
  *F16M 13/02* (2006.01)
  *E05D 7/04* (2006.01)
  (Continued)

(52) U.S. Cl.
  CPC ............... *A47G 1/24* (2013.01); *A47G 1/04* (2013.01); *E05D 7/0009* (2013.01); *E05D 7/04* (2013.01); *E05D 7/0415* (2013.01); *F16M 13/022* (2013.01); *F21V 33/004* (2013.01); *G02B 7/1824* (2013.01); *A47G 2200/08* (2013.01); *A47G 2200/085* (2013.01); *A47G 2200/146* (2013.01); *E05D 2007/0492* (2013.01); *E05Y 2201/696* (2013.01); *E05Y 2600/626* (2013.01); *F21Y 2103/10* (2016.08); *F21Y 2115/10* (2016.08)

(58) Field of Classification Search
  USPC ........................ 362/128, 129, 560, 492, 494; 16/235–249; 359/838, 850, 854, 855, 359/862, 865; 248/466, 475.1, 476, 479
  See application file for complete search history.

(56) References Cited

U.S. PATENT DOCUMENTS 1,788,209 A * 1/1931 Sheehan .................. A47G 1/14
  40/780
2,763,186 A * 9/1956 Barlow .................... A47G 1/04
  359/854
(Continued)

*Primary Examiner* — Alfred J Wujciak
(74) *Attorney, Agent, or Firm* — Lempia Summerfield Katz LLC

(57) ABSTRACT

A mirror system includes a base mirror assembly and an adjustable mirror assembly. The adjustable mirror assembly is coupled to the base mirror assembly. The adjustable mirror assembly includes an adjustable hinge system that facilitates movement of the adjustable mirror assembly relative to the base mirror assembly. The adjustable hinge system includes a first bracket, a second bracket, a hinge, and a third bracket. The first bracket is coupled to the base mirror assembly. The second bracket is coupled to the first bracket. The hinge is coupled to the adjustable mirror assembly. The third bracket is coupled to the hinge and the second bracket. The third bracket is coupled to the second bracket via a first screw such that the base mirror assembly is coupled to the adjustable mirror assembly. Rotation of the first screw causes movement of the adjustable mirror assembly relative to the base mirror assembly.

18 Claims, 8 Drawing Sheets

(51) Int. Cl.
  *G02B 7/182* (2006.01)
  *F21V 33/00* (2006.01)
  *F21Y 103/10* (2016.01)
  *F21Y 115/10* (2016.01)

(56) References Cited

U.S. PATENT DOCUMENTS

| | | | |
|---|---|---|---|
| 2,854,687 | A | 10/1958 | Baldauf |
| 3,145,257 | A * | 8/1964 | Suga ............... B60R 1/025 |
| | | | 359/854 |
| 3,187,629 | A * | 6/1965 | Rowell ............ A47B 67/005 |
| | | | 359/855 |
| 4,396,249 | A * | 8/1983 | Aisley ............. A47B 67/005 |
| | | | 248/289.11 |
| 4,401,288 | A | 8/1983 | Thompson |
| 4,460,246 | A | 7/1984 | Peel |
| 4,598,982 | A * | 7/1986 | Levine ............. B60R 1/081 |
| | | | 359/865 |
| 5,357,377 | A | 10/1994 | Payne, Jr. et al. |
| 5,430,578 | A | 7/1995 | Reagan |
| 5,438,457 | A | 8/1995 | Moore |
| 5,713,105 | A | 2/1998 | Toomey |
| 5,755,011 | A | 5/1998 | Green et al. |
| 5,777,808 | A | 7/1998 | Rashad |
| 6,293,681 | B1 | 9/2001 | Frank |
| 6,347,876 | B1 * | 2/2002 | Burton ............. A45D 42/10 |
| | | | 362/141 |
| 6,725,504 | B1 | 4/2004 | Dickson et al. |
| 7,240,400 | B2 | 7/2007 | Bonham |
| D552,851 | S | 10/2007 | Abrahamian |
| 7,334,295 | B2 | 2/2008 | Chou et al. |
| 8,393,749 | B1 | 3/2013 | Daicos |
| 8,863,358 | B2 | 10/2014 | Ochs |
| 2005/0183238 | A1 | 8/2005 | McCue et al. |

* cited by examiner

MIRROR SYSTEMS AND METHODS

CROSS-REFERENCE TO RELATED PATENT APPLICATION

This application claims the benefit of U.S. Provisional Patent Application No. 62/546,727 filed on Aug. 17, 2017, the entire disclosure of which is incorporated by reference herein.

BACKGROUND

The present application relates generally to a mirror system. In particular, this application relates to an adjustable mirror assembly system that includes a base mirror and adjustable mirror assemblies coupled to the base mirror.

Generally speaking, a mirror is utilized to provide a user with a visualization of an area adjacent the mirror. For example, mirrors are often utilized by a user to visualize the user's face. Users often desire to see more than one surface in the mirror. Typically, mirrors are generally attached to a surface and are stationary. Because the mirrors are stationary, users have to move in order to change what they see in the mirror. This requirement makes use of conventional mirrors cumbersome and undesirable.

SUMMARY

One embodiment of the present disclosure is related to a mirror system. The mirror system includes a base mirror assembly and an adjustable mirror assembly. The adjustable mirror assembly is coupled to the base mirror assembly. The adjustable mirror assembly includes an adjustable hinge system that facilitates movement of the adjustable mirror assembly relative to the base mirror assembly. The adjustable hinge system includes a first bracket, a second bracket, a hinge, and a third bracket. The first bracket is coupled to the base mirror assembly. The second bracket is coupled to the first bracket. The hinge is coupled to the adjustable mirror assembly. The third bracket is coupled to the hinge and the second bracket. The third bracket is coupled to the second bracket via a first screw such that the base mirror assembly is coupled to the adjustable mirror assembly. Rotation of the first screw causes movement of the adjustable mirror assembly relative to the base mirror assembly.

Another embodiment of the present disclosure is related to a mirror system. The mirror system includes a base mirror assembly and an adjustable mirror assembly. The adjustable mirror assembly is configured to be coupled to the base mirror assembly. The adjustable mirror assembly includes an adjustable hinge system that is configured to facilitate movement of the adjustable mirror assembly relative to the base mirror assembly. The adjustable hinge system includes a first bracket, a second bracket, a hinge, and a third bracket. The first bracket is configured to be coupled to the base mirror assembly. The hinge is configured to be coupled to the adjustable mirror assembly. The third bracket is configured to be coupled to the hinge and the second bracket. The third bracket is configured to be coupled to a first screw and configured such that the first screw is capable of contacting the first bracket to cause movement of the adjustable mirror assembly relative to the base mirror assembly.

Yet another embodiment of the present disclosure is related to a mirror system. The mirror system includes a base mirror assembly and an adjustable mirror assembly. The adjustable mirror assembly is configured to be coupled to the base mirror assembly. The adjustable mirror assembly includes an adjustable hinge system that is configured to facilitate movement of the adjustable mirror assembly relative to the base mirror assembly. The adjustable hinge system includes a first bracket, a second bracket, a third bracket, a hinge, and a fourth bracket. The first bracket is configured to be coupled to the base mirror assembly. The second bracket is configured to be coupled to the first bracket. The third bracket is configured to be coupled to the base mirror assembly. The hinge is configured to be coupled to the adjustable mirror assembly. The fourth bracket is configured to be coupled to the hinge and to at least one of the second bracket or the third bracket.

It is to be understood that both the foregoing general description and the following detailed description are exemplary and explanatory only and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Currently, mirrors may include rotatable members. These rotatable members are not adjustable and are difficult to manufacture in a way that preserves the integrity of the mirror as the rotatable members are moved. As a result, cost of these mirrors is often relatively high making them undesirable. Further, because these mirrors cannot be adjusted they cannot be tailored for a target application making these mirrors even less desirable.

An opportunity for providing a mirror with rotatable members that are adjustable exists by incorporating hinge assemblies that can facilitate independent vertical movement of the rotatable members into the mirror. Such a mirror would facilitate decreases in manufacturing costs and increase consumer satisfaction by allowing a user to tailor the mirror to a target application. Further, a gap between a base mirror and the rotatable members can be minimized through the use of these hinge assemblies resulting in a mirror that exhibits an aesthetic appearance that is superior to that of conventional mirrors which are not adjustable.

Figure 1A:
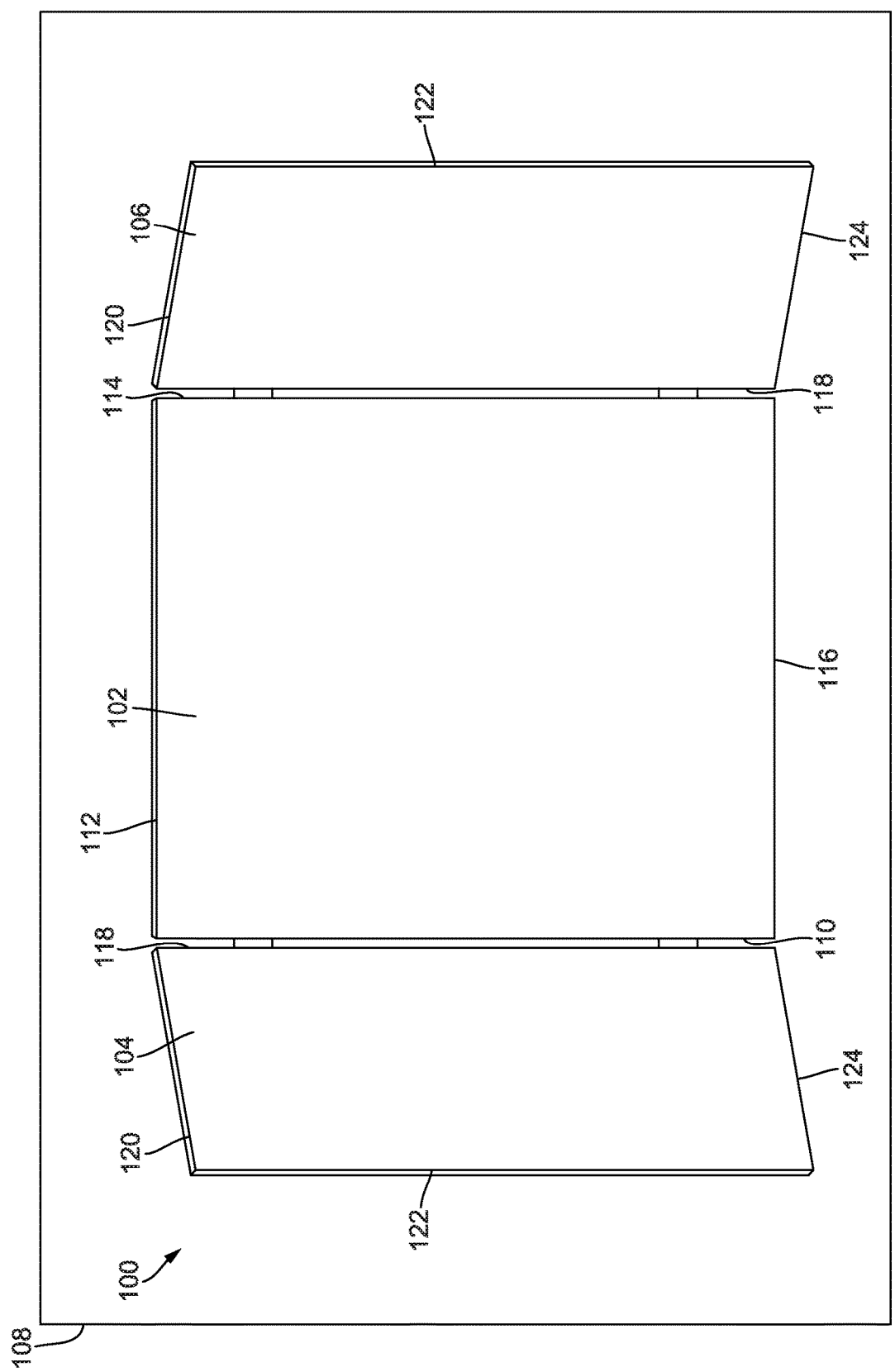
FIG. 1A is a front view of a mirror system, according to an exemplary embodiment of the present disclosure.
Figure 1B:
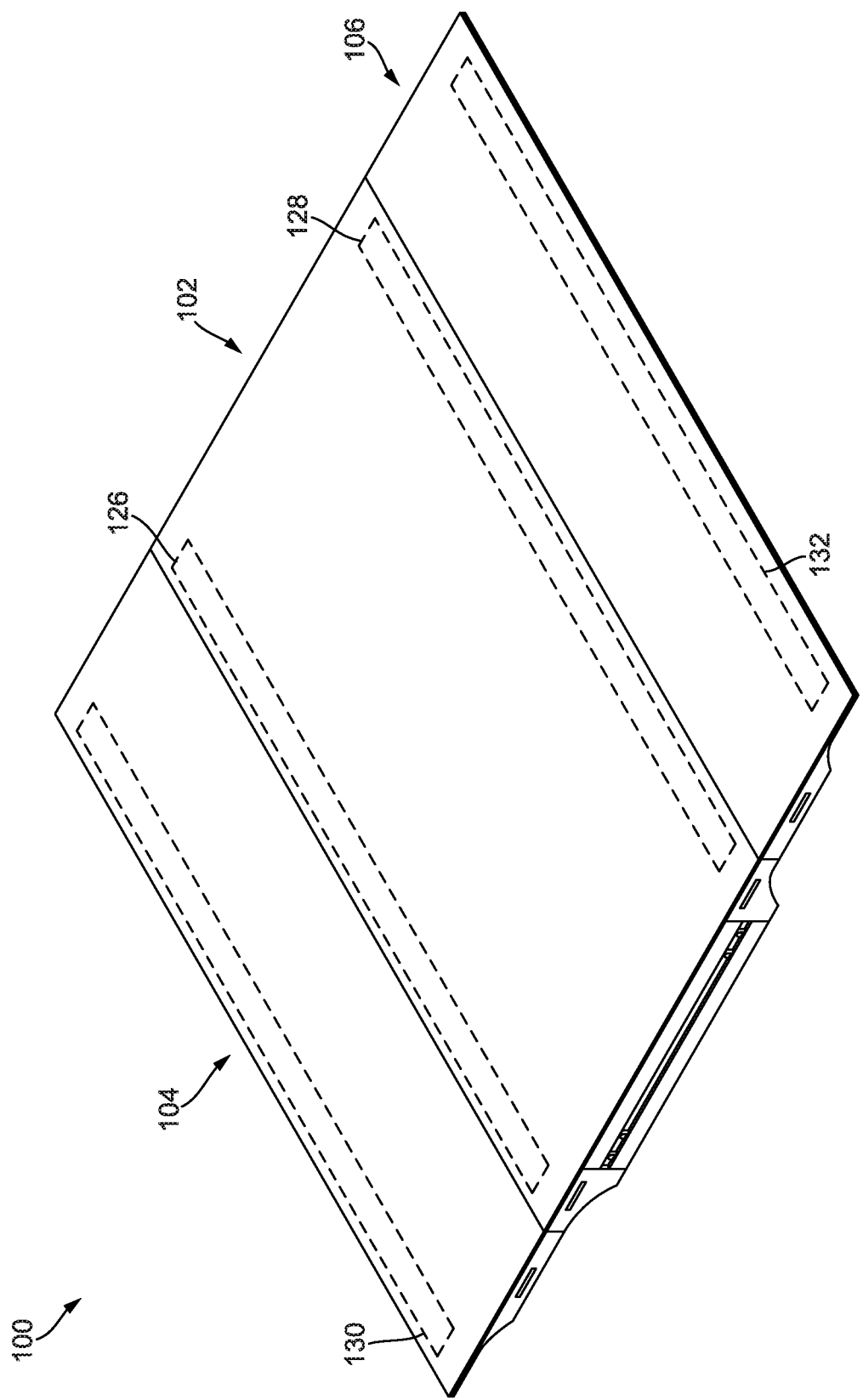
FIG. 1B is a front perspective view of a mirror system, such as the mirror system shown in FIG. 1A, according to an exemplary embodiment of the present disclosure.
Figure 1C:
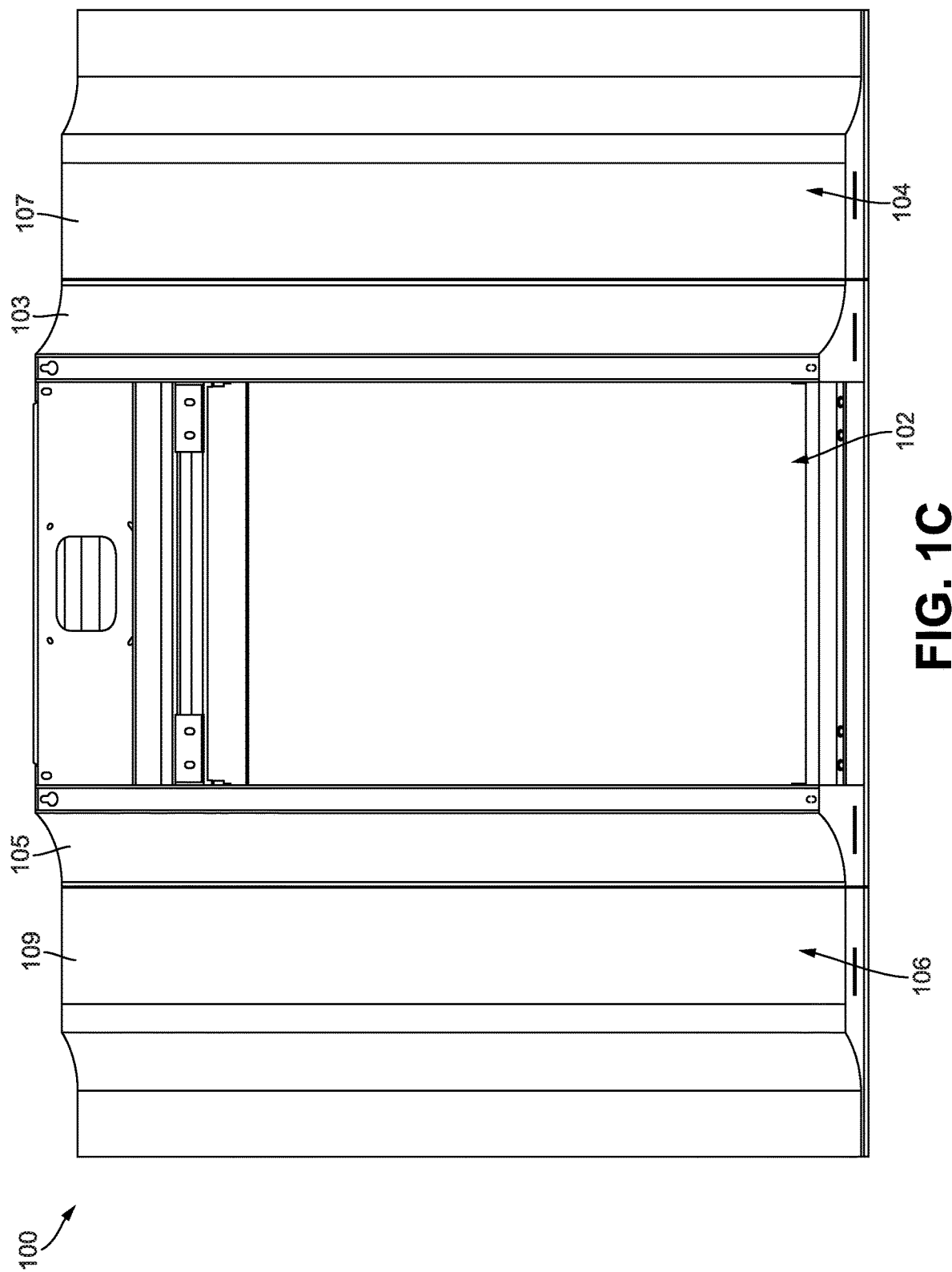
FIG. 1C is a rear perspective view of a mirror system, such as the mirror system shown in FIG. 1A, according to an exemplary embodiment of the present disclosure.

Referring to FIGS. 1A-1C, a mirror system (e.g., adjustable mirror assembly, tri-fold mirror, etc.), shown as a mirror system 100, is shown. The mirror system 100 is utilized by a user (e.g., assembly worker, manufacturer, owner, individual, etc.) to visualize an area adjacent the mirror system 100. For example, the mirror system 100 can be utilized by a user to visualize various surfaces on the user's face (e.g., a left side of the user's face, a right side of the user's face, etc.). In some applications, the mirror system 100 facilitates viewing of multiple surfaces on the user's face simultaneously (e.g., viewing a front of the user's face and a left side of the user's face, etc.). As shown in FIG. 1, the mirror system 100 includes a first mirror, shown as a base mirror assembly 102, a second mirror (e.g., wing, etc.), shown as an adjustable mirror assembly 104, and a second mirror (e.g., wing, etc.), shown as an adjustable mirror assembly 106. According to an exemplary embodiment, the base mirror assembly 102 is coupled to (e.g., attached to, mounted on, etc.) a surface, shown as a wall 108. The mirror system 100 may have, for example, an overall height of thirty-three inches and an overall width of between thirty-four and forty inches. In some applications, each of the adjustable mirror assembly 104 and the adjustable mirror assembly 106 is eight inches wide.

The base mirror assembly 102 includes a mirror and a frame. The base mirror assembly 102 may include a mechanism for coupling the mirror system 100 to the wall 108. The adjustable mirror assembly 104 and the adjustable mirror assembly 106 each include a mirror and a frame. The base mirror assembly 102, the adjustable mirror assembly 104, and the adjustable mirror assembly 106 may include additional or fewer components than described herein such that the mirror system 100 is tailored for a target application.

The base mirror assembly 102, the adjustable mirror assembly 104, and the adjustable mirror assembly 106 may be constructed in various shapes, sizes, and configurations. As shown in FIG. 1A, the base mirror assembly 102, the adjustable mirror assembly 104, and the adjustable mirror assembly 106 are rectangular. According to an exemplary embodiment, the base mirror assembly 102 is defined by a first side, shown as a vertical side 110, a second side, shown as a horizontal side 112, a third side, shown as a vertical side 114, and a fourth side, shown as a horizontal side 116. In applications where the base mirror assembly 102 is rectangular or square, the vertical side 110 is parallel with the vertical side 114 and the horizontal side 112 is parallel with the horizontal side 116. Similarly, the adjustable mirror assembly 104 and the adjustable mirror assembly 106, in an exemplary embodiment, are each defined by a first side, shown as a vertical side 118, a second side, shown as a horizontal side 120, a third side, shown as a vertical side 122, and a fourth side, shown as a horizontal side 124. In applications where the adjustable mirror assembly 104 and the adjustable mirror assembly 106 are each rectangular or square, the vertical sides 118 are parallel with the vertical sides 122, and the horizontal sides 120 are parallel with the horizontal sides 124.

The adjustable mirror assembly 104 and the adjustable mirror assembly 106 are selectively repositionable relative to the base mirror assembly 102. By repositioning the adjustable mirror assembly 104 and/or the adjustable mirror assembly 106, the mirror system 100 can be reconfigured by the user such that the mirror system 100 is tailored to provide the user with an optimized viewing experience for a target application. For example, the user may reposition the adjustable mirror assembly 104 and/or the adjustable mirror assembly 106 to provide for an optimized viewing experience at a location in front of a sink where a user would stand when using the sink. In this example, the ability of the adjustable mirror assembly 104 and the adjustable mirror assembly 106 to be repositioned may increase the ability of the user to, for example, apply makeup, shave, or perform other similar tasks.

According to various embodiments, the mirror system 100 incorporates lighting elements into at least one of the base mirror assembly 102, the adjustable mirror assembly 104, and the adjustable mirror assembly 106. As shown in FIG. 1B, the mirror system 100 includes a first lighting element (e.g., light, lamp, light emitting diode (LED) array, LED strip, etc.), shown as a first lighting element 126, disposed within the base mirror assembly 102, a second lighting element (e.g., light, lamp, LED array, LED strip, etc.), shown as a second lighting element 128, disposed within the base mirror assembly 102, a third lighting element (e.g., light, lamp, LED array, LED strip, etc.), shown as a third lighting element 130, disposed within the adjustable mirror assembly 104, and a fourth lighting element (e.g., light, lamp, LED array, LED strip, etc.), shown as a fourth lighting element 132, disposed within the adjustable mirror assembly 106.

Each of the first lighting element 126, the second lighting element 128, and third lighting element 130, and the fourth lighting element 132 may be configured to provide substantially no dark spots or hot spots. For example, each of the first lighting element 126, the second lighting element 128, and third lighting element 130, and the fourth lighting element 132 may incorporate various lens, diffusers, and other structures. In some applications, the adjustable mirror assembly 104 and the adjustable mirror assembly 106 each include light guides that direct light emitted from the third lighting element 130 and the fourth lighting element 132, respectively.

Each of the first lighting element 126, the second lighting element 128, and third lighting element 130, and the fourth lighting element 132 may include any number of individual lighting elements. In an exemplary embodiment, each of the first lighting element 126, the second lighting element 128, and third lighting element 130, and the fourth lighting element 132 includes two LED strips. For example, the third lighting element 130 may include two LED strips with a light guide positioned therebetween.

In an exemplary embodiment, the mirror system 100 includes only lighting elements in the adjustable mirror assembly 104 and the adjustable mirror assembly 106, such as the third lighting element 130 and the fourth lighting element 132, and does not include lighting elements in the base mirror assembly 102, such as the first lighting element 126 and the second lighting element 128. In another exemplary embodiment, the mirror system 100 does not include lighting elements in the adjustable mirror assembly 104 and the adjustable mirror assembly 106, such as the third lighting element 130 and the fourth lighting element 132, and only includes lighting elements in the base mirror assembly 102, such as the first lighting element 126 and the second lighting element 128.

The base mirror assembly 102 also includes a rear cover 103 and a rear cover 105. The rear cover 103 and the rear cover 105 cover (e.g., conceal, encapsulate, etc.) portions of adjustable hinge systems that are coupled to the base mirror assembly 102. Similarly, the adjustable mirror assembly 104 also includes a rear cover 107 and the adjustable mirror assembly 106 includes a rear cover 109. The rear cover 107 is coupled to the adjustable mirror assembly 104 and covers portions of an adjustable hinge system that is coupled to the adjustable mirror assembly 104. Similarly, the rear cover 109 is coupled to the adjustable mirror assembly 106 and covers portions of an adjustable hinge system that is coupled to the adjustable mirror assembly 106.

Figure 1D:
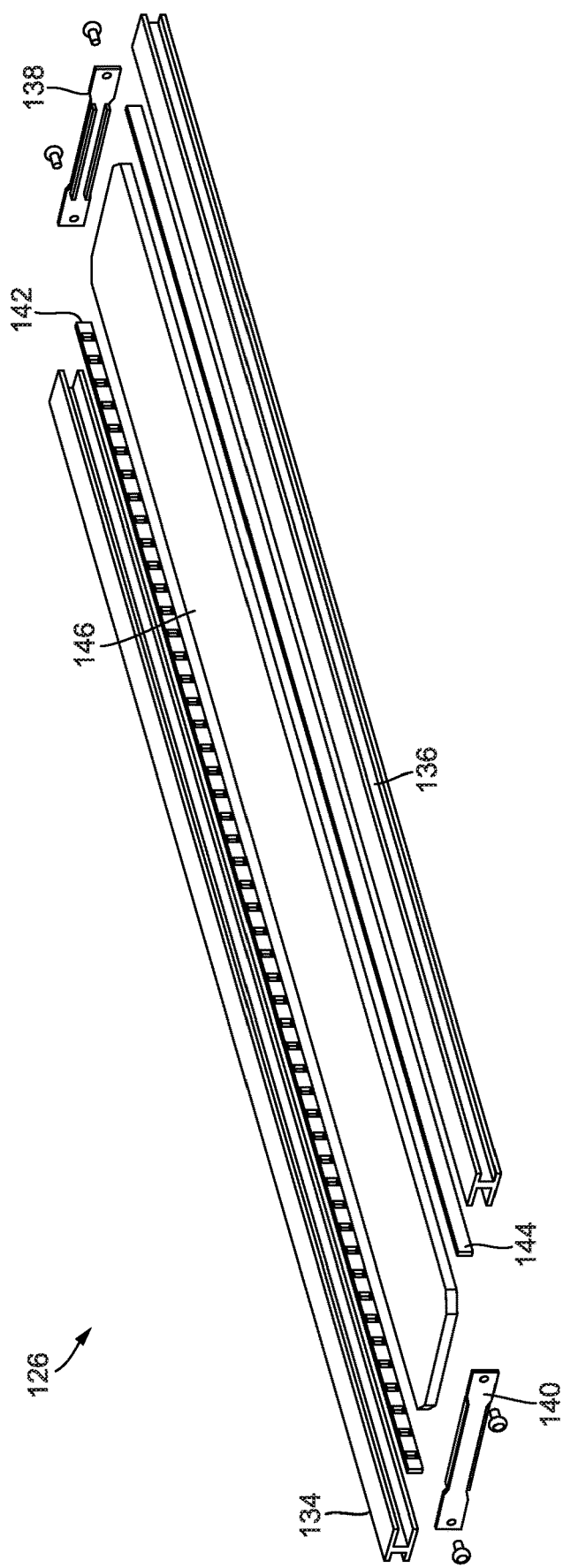
FIG. 1D is an exploded perspective view of a lighting element for a mirror system, such as the mirror system shown in FIG. 1A, according to an exemplary embodiment of the present disclosure.

FIG. 1D illustrates the first lighting element 126 according to an exemplary embodiment. As shown, the first lighting element 126 includes a first frame member, shown as a rail 134, a second frame member, shown as a rail 136, a third frame member, shown as an endcap 138, and a fourth frame member, shown as an endcap 140. The first lighting element 126 also includes a first LED strip, shown as an LED strip 142, a second LED strip, shown as an LED strip 144, and a guide, shown as a light guide 146. The LED strip 142 is positioned within the rail 134 and the LED strip 144 is positioned within the rail 136. The rail 134, the rail 136, the endcap 138, and the endcap 140 cooperatively contain the light guide 146. Light emitted from the LED strip 142 and the LED strip 144 propagates through the light guide 146 and is dispersed outward. While FIG. 1D illustrates the first lighting element 126, it is understood that any of the second lighting element 128, the third lighting element 130, and the fourth lighting element 132 may have a similar construction and configuration.

Depending on the application, the mirror system 100 may include additional or fewer lighting elements. Further, any of the first lighting element 126, the second lighting element 128, and third lighting element 130, and the fourth lighting element 132 may be repositioned to various suitable locations within the mirror system 100. For example, in some applications neither the adjustable mirror assembly 104 nor the adjustable mirror assembly 106 includes lighting elements while the base mirror assembly 102 includes three lighting elements.

The first lighting element 126, the second lighting element 128, and third lighting element 130, and the fourth lighting element 132 may be controlled independent from one another or collaboratively. In some applications, the first lighting element 126, the second lighting element 128, and third lighting element 130, and the fourth lighting element 132 are collectively controlled by a switch (e.g., on/off switch, power switch, etc.) or sensor (e.g., motion sensor, illumination sensor, voice sensor, etc.). The first lighting element 126, the second lighting element 128, and third lighting element 130, and the fourth lighting element 132 may, for example, collectively produce light at one thousand and one-hundred lux as measured twenty-two inches from the mirror system 100. In some applications, the first lighting element 126, the second lighting element 128, and third lighting element 130, and the fourth lighting element 132 collectively produce between eight-hundred and one-thousand two-hundred lux as measured twenty-two inches from the mirror system 100.

The mirror system 100 may be installed in various different applications such as, for example, a restroom (e.g., residential restroom, commercial restroom, portable restroom, bathroom, etc.), a bedroom (e.g., a hotel room, etc.), or other similar room or location (e.g., powder room, green room, makeup room, costume room, etc.).

Figure 2A:
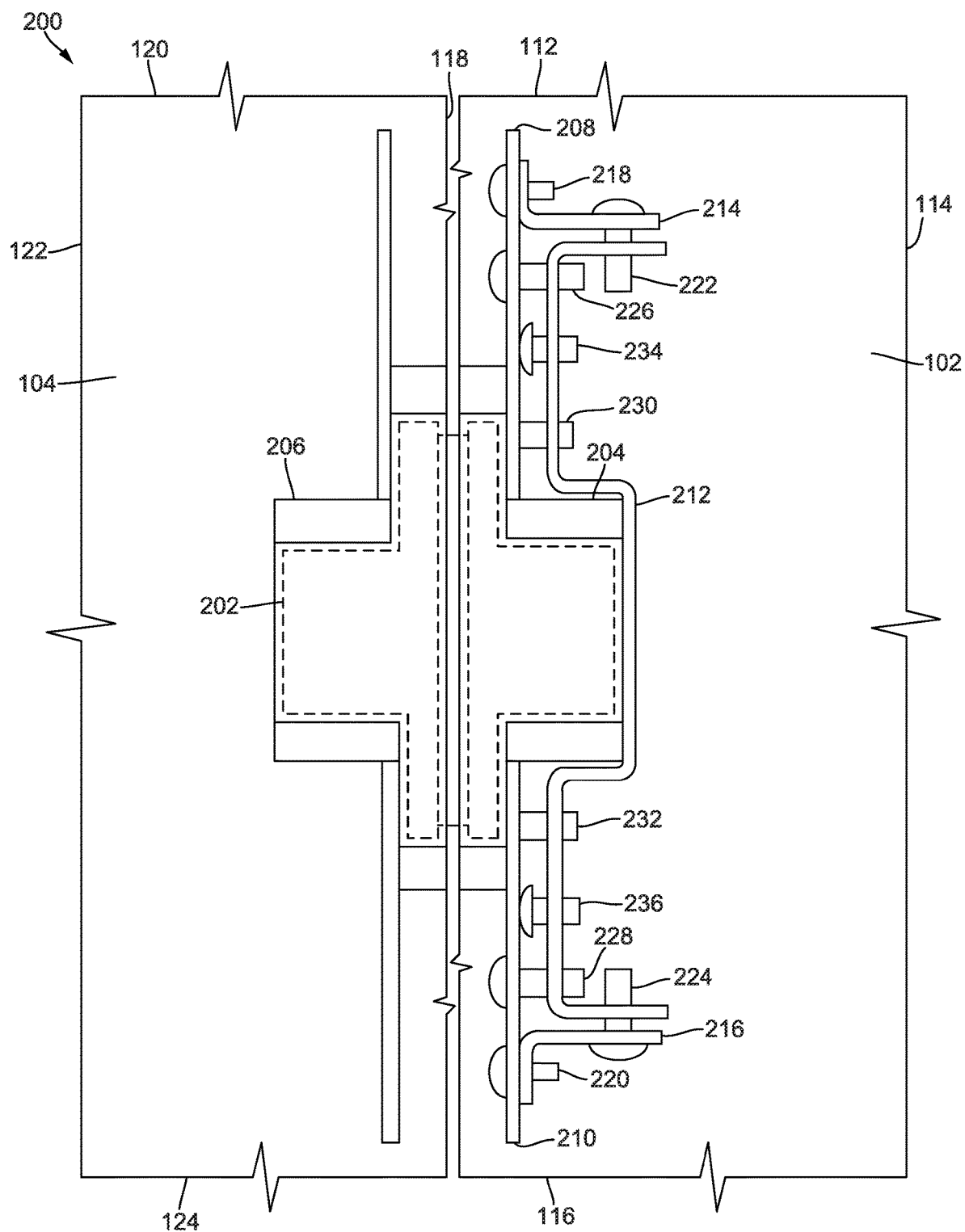
FIG. 2A is a front view of a hinge system for use in a mirror system, such as the mirror system shown in FIG. 1A, according to an exemplary embodiment of the present disclosure.
Figure 2B:
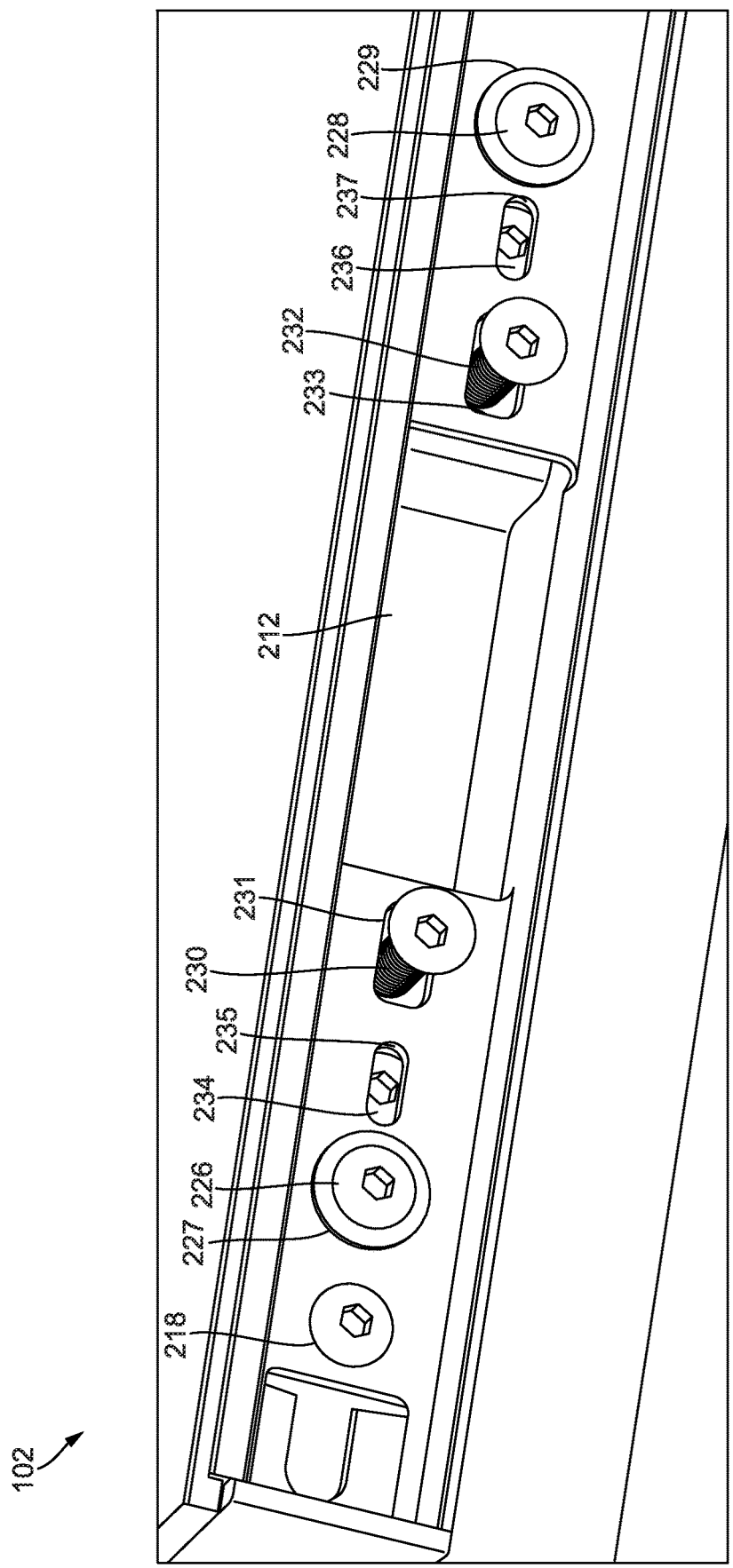
FIG. 2B is a partial view of a hinge system for use in a mirror system, such as the mirror system shown in FIG. 1A, according to an exemplary embodiment of the present disclosure.
Figure 2C:
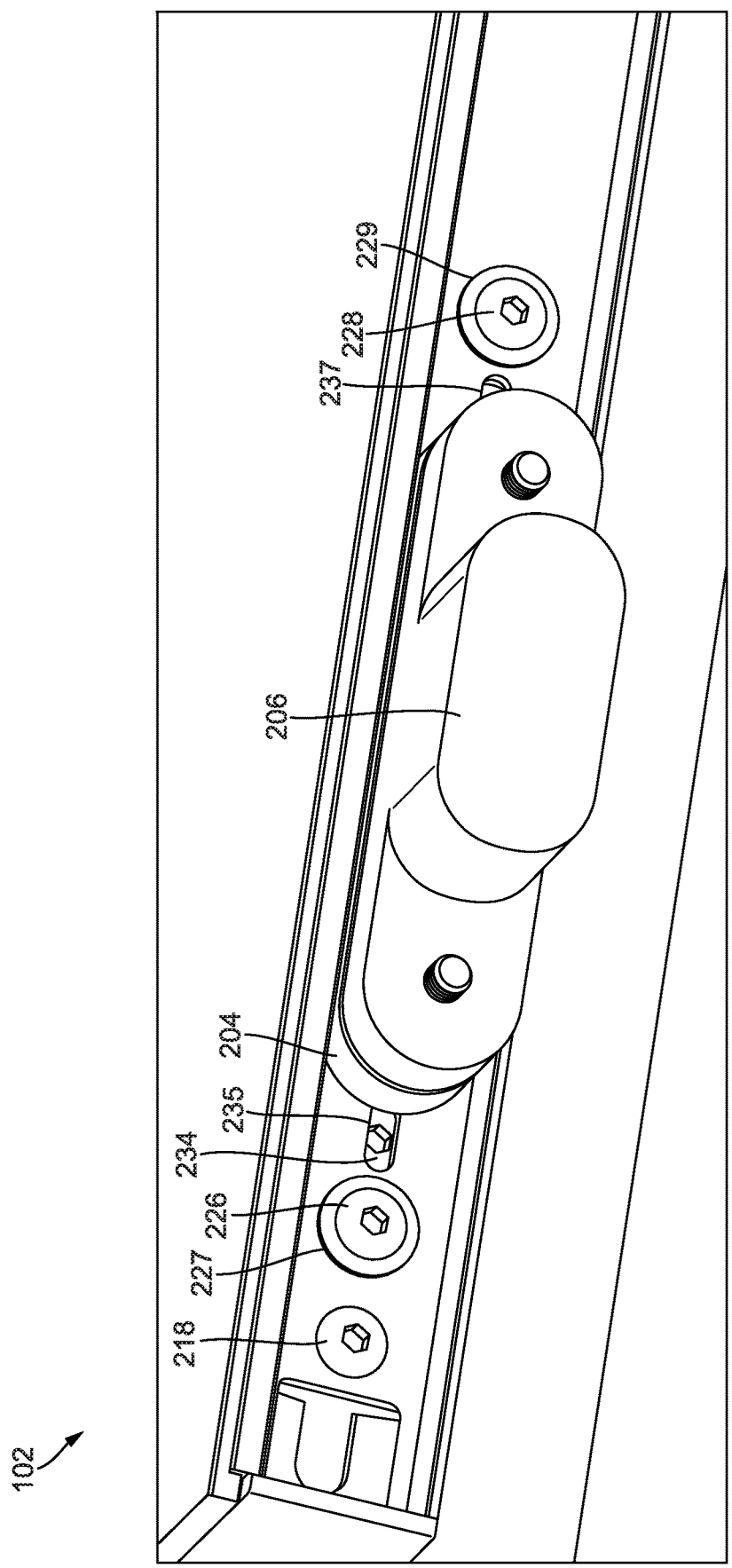
FIG. 2C is another partial view of a hinge system for use in a mirror system, such as the mirror system shown in FIG. 1A, according to an exemplary embodiment of the present disclosure.

Referring now to FIGS. 2A-C, a hinge system, shown as an adjustable hinge system 200, is shown. In FIG. 2A, the rear cover 103 and the rear cover 107 are hidden (e.g., not shown, etc.) for illustrative purposes only. The adjustable hinge system 200 is included in the mirror system 100 and couples one of the adjustable mirror assembly 104 and the adjustable mirror assembly 106 with the base mirror assembly 102. According to various embodiments, the mirror system 100 includes a plurality of adjustable hinge systems 200. For example, in an exemplary embodiment, the mirror system 100 includes two adjustable hinge systems 200 that couple the adjustable mirror assembly 104 to the base mirror assembly 102 and two adjustable hinge systems 200 that couple the adjustable mirror assembly 106 to the base mirror assembly 102. FIG. 2A illustrates an exemplary embodiment where the adjustable hinge system 200 couples the base mirror assembly 102 to the adjustable mirror assembly 104. While not shown in FIG. 2A, it is understood that one or more additional adjustable hinge systems 200 may also be coupled to the base mirror assembly 102 and the adjustable mirror assembly 106.

The adjustable hinge system 200 facilitates rotation of the adjustable mirror assembly 104 relative to the base mirror assembly 102. The adjustable hinge system 200 includes a hinge, shown as a concealed hinge 202. The concealed hinge 202 is contained (e.g., concealed, etc.) within a first housing, shown as a housing 204, in the base mirror assembly 102, and a second housing, shown as a housing 206, in the adjustable mirror assembly 104. The concealed hinge 202 may be contained within the mirror system 100 such that the concealed hinge 202 is not visible, as shown in FIG. 1C.

The concealed hinge 202 is coupled to the base mirror assembly 102 via the housing 204 and to the adjustable mirror assembly 104 through the housing 206. The housing 204 and the housing 206 contain the concealed hinge 202 such that only a minimal amount of the concealed hinge 202 can be seen. In this way, the adjustable hinge system 200 provides the mirror system 100 with a greater aesthetic quality than conventional mirrors which include hinges that are very visible. Through the use of the adjustable hinge system 200, the mirror system 100 is more desirable than conventional mirrors.

According to an exemplary embodiment, the base mirror assembly 102, the adjustable mirror assembly 104, and the adjustable mirror assembly 106 are relatively thin (e.g., compared to wall mounted mirror systems, etc.). The thin nature of the base mirror assembly 102, the adjustable mirror assembly 104, and the adjustable mirror assembly 106 is, in part, attributable to the configuration of the concealed hinge 202 within base mirror assembly 102 and the adjustable mirror assembly 104 and/or the adjustable mirror assembly 106.

The adjustable hinge system 200 also facilitates selective repositioning (e.g., vertically, etc.) of the adjustable mirror assembly 104 relative to the base mirror assembly 102. For example, the concealed hinge 202 facilitates a rotation of the adjustable mirror assembly 104. This rotation may be, in some applications, up to approximately one-hundred and eighty degrees relative to the base mirror assembly 102. In other applications, the concealed hinge 202 may facilitate more or less rotation of the adjustable mirror assembly 104 relative to the base mirror assembly 102.

The adjustable hinge system 200 allows a user to fine tune (e.g., calibrate, etc.) the vertical (e.g., up/down, etc.) position of the adjustable mirror assembly 104 and/or the adjustable mirror assembly 106 relative to the base mirror assembly 102. The adjustable hinge system 200 includes a first bracket (e.g., flange, structure, etc.), shown as a mounting bracket 208, and a second bracket, shown as a mounting bracket 210. As shown in FIG. 2, the mounting bracket 208 and the mounting bracket 210 are coupled to the base mirror assembly 102 (e.g., to a rear side of the base mirror assembly 102 opposite to a front side of the base mirror assembly 102, etc.). For example, the mounting bracket 208 and the mounting bracket 210 may be constructed from an angle bracket having a portion (e.g., a face, a side, etc.) that is coupled (e.g., attached, affixed, welded, riveted, fastened, etc.) to the base mirror assembly 102. According to an exemplary embodiment, the mounting bracket 208 and the mounting bracket 210 are integrated within, and extrude from, the base mirror assembly 102.

The adjustable hinge system 200 also includes a third bracket (e.g., flange, structure, saddle, etc.), shown as a hinge bracket 212. The hinge bracket 212 is coupled to the housing 204 and, therefore, to the concealed hinge 202. For example, the hinge bracket 212 may be coupled (e.g., attached, affixed, welded, riveted, fastened, etc.) to the housing 204 along a vertical side of the housing 204. Vertical movement of the hinge bracket 212 causes vertical movement of the concealed hinge 202 and, therefore, of the adjustable mirror assembly 104. Similarly, vertical movement of the adjustable mirror assembly 104 causes vertical movement of the concealed hinge 202 and, therefore, of the hinge bracket 212.

The hinge bracket 212 is selectively coupled to the mounting bracket 208 and the mounting bracket 210. The adjustable hinge system 200 includes a fourth bracket (e.g., flange, structure, etc.), shown as a coupling bracket 214, a fifth bracket (e.g., flange, structure, etc.), shown as a coupling bracket 216, a first fastener (e.g., bolt, threaded rod, screw, machine screw, etc.), shown as a coupling screw 218, a second fastener (e.g., bolt, threaded rod, screw, machine screw, etc.), shown as a coupling screw 220, a third fastener (e.g., bolt, threaded rod, screw, machine screw, etc.), shown as a pull screw 222, and a fourth fastener (e.g., bolt, threaded rod, screw, machine screw, etc.), shown as a pull screw 224.

The coupling bracket 214 is fastened to the mounting bracket 208 through the use of the coupling screw 218 (e.g., via a threaded aperture in the coupling bracket 214 and a threaded aperture in the mounting bracket 208, etc.). In some applications, a permanent fastening mechanism, such as a rivet or weld, is used in place of, or in addition to, the coupling screw 218 to attach the coupling bracket 214 to the mounting bracket 208. Similarly, the coupling bracket 216 is fastened to the mounting bracket 210 through the use of the screw 220 (e.g., via a threaded aperture in the coupling bracket 216 and a threaded aperture in the mounting bracket 208, etc.). In some applications, a permanent fastening mechanism, such as a rivet or weld, is used in place of, or in addition to, the screw 220 to attach the coupling bracket 216 to the mounting bracket 210.

The pull screw 222 selectively attaches the coupling bracket 214 to the hinge bracket 212. The pull screw 222 is configured to (e.g., is capable of, is structure to, etc.) selectively extend through a threaded aperture (e.g., opening, hole, etc.) in the coupling bracket 214 into a threaded aperture (e.g., opening, hole, etc.) in the hinge bracket 212. When the pull screw 222 extends through both the threaded aperture in the coupling bracket 214 and the threaded aperture in the hinge bracket 212, the coupling bracket 214 is attached to the hinge bracket 212. Similarly, the pull screw 224 selectively attaches the coupling bracket 216 to the hinge bracket 212. The pull screw 224 is configured to (e.g., is capable of, is structure to, etc.) selectively extend through a threaded aperture (e.g., opening, hole, etc.) in the coupling bracket 216 into a threaded aperture (e.g., opening, hole, etc.) in the hinge bracket 212. When the pull screw 224 extends through both the threaded aperture in the coupling bracket 216 and the threaded aperture in the hinge bracket 212, the coupling bracket 216 is attached to the hinge bracket 212.

While the adjustable hinge system 200 is shown in FIG. 2A as incorporating two of the pull screws 222, the adjustable hinge system 200 may include only one of the pull screws 222 in some applications. For example, where the mirror system 100 includes two adjustable hinge systems 200 coupling one of the adjustable mirror assembly 104 and the adjustable mirror assembly 106 to the base mirror assembly 102, each of the adjustable hinge systems 200 includes only a single pull screw 222. In these applications, one of the adjustable hinge systems 200 (e.g., the uppermost adjustable hinge system 200, etc.) includes the pull screw 222 on one side (e.g., top side, etc.) of the mirror system 100 and the other of the adjustable hinge systems 200 (e.g., the bottommost adjustable hinge system 200, etc.) includes the pull screw 222 on the other side (e.g., bottom side, etc.) of the mirror system 100. To raise the one of the adjustable mirror assembly 104 and the adjustable mirror assembly 106, one of the pull screws 222 (e.g., the top pull screw 222, etc.) is turned in one direction (e.g., clockwise, tightening direction, etc.) and the other of the pull screws 222 is turned in an opposite direction (e.g., counterclockwise, loosening direction, etc.). In this way, a user may interact with the pull screw 222 of each of the adjustable hinge systems 200 without taking apart the mirror system 100 or removing the mirror system 100 from a wall. To lower the one of the adjustable mirror assembly 104 and the adjustable mirror assembly 106, one of the pull screws 222 (e.g., the top pull screw 222, etc.) is turned in one direction (e.g., counterclockwise, loosening direction, etc.) and the other of the pull screws 222 is turned in an opposite direction (e.g., clockwise, tightening direction, etc.). In some other application where the mirror system 100 only includes a single adjustable hinge system 200 coupling one of the adjustable mirror assembly 104 and the adjustable mirror assembly 106 to the base mirror assembly 102, the single adjustable hinge system 200 includes two pull screws 222 as shown in FIG. 2A.

A user can manipulate the pull screw 222 and the pull screw 224 to cause vertical repositioning of the adjustable mirror assembly 104 relative to the base mirror assembly 102. For example, in an application where the pull screw 222 and the pull screw 224 are defined by the same thread direction (e.g., right hand thread, left hand thread, etc.), rotation of the pull screw 222 and the pull screw 224 in same direction will cause repositioning of the adjustable mirror assembly 104 relative to the base mirror assembly 102, assuming that the pull screw 222 remains within the extended through both the threaded aperture in the coupling bracket 214 and the threaded aperture in the hinge bracket 212 and/or that the pull screw 224 remains extended through both the threaded aperture in the coupling bracket 216 and the threaded aperture in the hinge bracket 212. In this way, as the hinge bracket 212 is threaded further onto the pull screw 222 the hinge bracket 212 is simultaneously threaded further off of the pull screw 224. Similarly, as the hinge bracket 212 is threaded further onto the pull screw 224 the hinge bracket 212 is simultaneously threaded further off of the pull screw 222.

FIG. 2B illustrates a view of the mirror system 100 with the adjustable mirror assembly 104 and the concealed hinge 202 hidden and FIG. 2C illustrates a view of the mirror system 100 with the adjustable mirror assembly 104 hidden. The adjustable hinge system 200 also includes a fifth fastener (e.g., bolt, threaded rod, screw, machine screw, etc.), shown as a tie down screw 226, and a sixth fastener (e.g., bolt, threaded rod, screw, machine screw, etc.), shown as a tie down screw 228. As shown in FIGS. 2B and 2C, the tie down screw 226 extends through an aperture (e.g., elongated hole, channel, track, slot, etc.), shown as a first aperture 227, in the mounting bracket 208 and into a threaded aperture (e.g., opening, hole, etc.) in the hinge bracket 212. Similarly, the tie down screw 228 extends through an aperture (e.g., elongated hole, channel, track, slot, etc.), shown as a second aperture 229, in the mounting bracket 210 and into a threaded aperture (e.g., opening, hole, etc.) in the hinge bracket 212.

The adjustable hinge system 200 also includes a seventh fastener (e.g., bolt, threaded rod, screw, machine screw, etc.), shown as a hinge screw 230, and an eighth fastener (e.g., bolt, threaded rod, screw, machine screw, etc.), shown as a hinge screw 232. As shown in FIGS. 2B and 2C, the hinge screw 230 extends through an aperture (e.g., elongated hole, channel, track, slot, etc.), shown as a third aperture 231, in the mounting bracket 208 and into a threaded aperture (e.g., opening, hole, etc.) in the hinge bracket 212. Similarly, the hinge screw 232 extends through an aperture (e.g., elongated hole, channel, track, slot, etc.), shown as a fourth aperture 233, in the mounting bracket 210 and into a threaded aperture (e.g., opening, hole, etc.) in the hinge bracket 212.

The adjustable hinge system 200 also includes a ninth fastener (e.g., bolt, threaded rod, screw, machine screw, etc.), shown as a jack screw 234, and a tenth fastener (e.g., bolt, threaded rod, screw, machine screw, etc.), shown as a jack screw 236. The jack screw 234 is selectively repositionable within a threaded aperture (e.g., opening, hole, etc.) in the hinge bracket 212 and contacts the mounting bracket 208. The contact between the jack screw 234 and the mounting bracket 208 can cause tilting of the hinge bracket 212 relative to the base mirror assembly 102. As shown in FIGS. 2B and 2C, the mounting bracket 208 includes an aperture (e.g., elongated hole, channel, track, slot, etc.), shown as a fifth aperture 235, that provides access to the jack screw 234 such that a user may rotate the jack screw 234 to cause tilting of the hinge bracket 212 relative to the base mirror assembly 102. The jack screw 236 is selectively repositionable within a threaded aperture (e.g., opening, hole, etc.) in the hinge bracket 212 and contacts the mounting bracket 210. The contact between the jack screw 236 and the mounting bracket 210 can cause tilting of the hinge bracket 212 relative to the base mirror assembly 102. As shown in FIGS. 2B and 2C, the mounting bracket 210 includes an aperture (e.g., elongated hole, channel, track, slot, etc.), shown as a sixth aperture 237, that provides access to the jack screw 236 such that a user may rotate the jack screw 236 to cause tilting of the hinge bracket 212 relative to the base mirror assembly 102. The first aperture 227, the second aperture 229, the third aperture 231, the fourth aperture 233, the fifth aperture 235, and the sixth aperture 237 may be defined by a length that is equal to, for example, one-eighth of an inch. However, other similar lengths and dimensions of any of the first aperture 227, the second aperture 229, the third aperture 231, the fourth aperture 233, the fifth aperture 235, and the sixth aperture 237 are also possible.

The adjustable hinge system 200 may be utilized to minimize (e.g., decrease, etc.) a gap between a mirror of the adjustable mirror assembly 104 and a mirror of the base mirror assembly 102 and/or a gap between a mirror of the adjustable mirror assembly 106 and a mirror of the base mirror assembly 102. For example, this gap may be created when the mirror system 100 is manufactured (e.g., due to a tolerance, etc.). The gap may be measured when the mirror of the adjustable mirror assembly 104 and/or the mirror of the adjustable mirror assembly 106 is substantially parallel to (e.g., coplanar with, aligned with, etc.) the mirror of the base mirror assembly 102. Minimizing of this gap is desirable because it may increase the aesthetic appearance and/or performance of the mirror system 100. For example, the adjustable hinge system 200 may be utilized to minimize the gap between the mirror of the adjustable mirror assembly 104 and the mirror of the base mirror assembly 102 by selectively repositioning the jack screw 234 and/or the jack screw 236. Further, the adjustable hinge system 200 may be used to rotate (e.g., tilt, etc.) the adjustable mirror assembly 104 and/or the adjustable mirror assembly 106 relative to the base mirror assembly 102 to prevent interference (e.g., binding, etc.) between the base mirror assembly 102 and the adjustable mirror assembly 104, such as when the adjustable mirror assembly 104 is rotated relative to the base mirror assembly 102, and/or between the base mirror assembly 102 and the adjustable mirror assembly 106, such as when the adjustable mirror assembly 106 is rotated relative to the base mirror assembly 102. To facilitate the selective repositioning of the jack screw 234 and/or the jack screw 236, a user may rotate the adjustable mirror assembly 104 and/or the adjustable mirror assembly 106 relative to the base mirror assembly 102 such that the user can access the jack screw 234 and/or the jack screw 236 through a slot within the mounting bracket 208 and/or the bracket 219, respectively.

The adjustable hinge system 200 may be utilized to selectively reposition the adjustable mirror assembly 104 relative to the base mirror assembly 102 and/or to selectively reposition the adjustable mirror assembly 106 relative to the base mirror assembly 102. A user can reposition the adjustable mirror assembly 104 and/or the adjustable mirror assembly 106 to change what the user sees in the mirror of the adjustable mirror assembly 104, the mirror of the adjustable mirror assembly 106, and/or the mirror of the base mirror assembly 102.

For example, to reposition the adjustable mirror assembly 104 up (e.g., relative to a ground surface, etc.), a user first loosens the tie down screw 226, the tie down screw 228, the hinge screw 230, and the hinge screw 232. Next, the user loosens the pull screw 224 and correspondingly tightens the pull screw 222. This tightening of the pull screw 222, along with a lifting force provided by the user, will cause the adjustable mirror assembly 104 to be raised relative to the base mirror assembly 102. After a target position of the adjustable mirror assembly 104 has been achieved, the user tightens the tie down screw 226, the tie down screw 228, the hinge screw 230, and the hinge screw 232. The user may then rotate the adjustable mirror assembly 104 to see if any interference between the adjustable mirror assembly 104 and the base mirror assembly 102 occurs. If any interference occurs, the user can adjust the jack screw 234 and/or the jack screw 236 to tilt the adjustable mirror assembly 104 relative to the base mirror assembly 102 until the interference is substantially eliminated. Instead of, or in addition to, examining interference between the base mirror assembly 102 and the adjustable mirror assembly 104, the user can examine a gap between the base mirror assembly and the adjustable mirror assembly 104 and adjust the jack screw 234 and/or the jack screw 236 accordingly (e.g., to maintain a desirable aesthetic appearance, etc.).

In another example, to reposition the adjustable mirror assembly 104 down (e.g., relative to a ground surface, etc.), a user first loosens the tie down screw 226, the tie down screw 228, the hinge screw 230, and the hinge screw 232. Next, the user loosens the pull screw 222 and correspondingly tightens the pull screw 224. This tightening of the pull screw 224, along with the force of gravity, will cause the adjustable mirror assembly 104 to be lowered relative to the base mirror assembly 102. After a target position of the adjustable mirror assembly 104 has been achieved, the user tightens the tie down screw 226, the tie down screw 228, the hinge screw 230, and the hinge screw 232. The user may then rotate the adjustable mirror assembly 104 to see if any interference between the adjustable mirror assembly 104 and the base mirror assembly 102 occurs. If any interference occurs, the user can adjust the jack screw 234 and/or the jack screw 236 to tilt the adjustable mirror assembly 104 relative to the base mirror assembly 102 until the interference is substantially eliminated. Instead of, or in addition to, examining interference between the base mirror assembly 102 and the adjustable mirror assembly 104, the user can examine a gap between the base mirror assembly and the adjustable mirror assembly 104 and adjust the jack screw 234 and/or the jack screw 236 accordingly (e.g., to maintain a desirable aesthetic appearance, etc.).

As shown in FIG. 2, vertical movement of the adjustable mirror assembly 104 relative to the base mirror assembly 102 is constrained by interference between the housing 204, the mounting bracket 208, and the mounting bracket 210. According to an exemplary embodiment, the housing 204 is rounded and the mounting bracket 208 and the mounting bracket 210 each contain an aperture (e.g., a rounded aperture, etc.) that is configured to at least partially receive the housing 204. When the housing 204 contacts the mounting bracket 208, further upwards movement of the adjustable mirror assembly 104 relative to the base mirror assembly 102 is prevented. Similarly, when the housing 204 contacts the mounting bracket 210, further downwards movement of the adjustable mirror assembly 104 relative to the base mirror assembly 102 is prevented.

While FIG. 2 illustrates a particular arrangement and configuration of the adjustable hinge system 200, it is understood that other similar configurations are also possible. For example, the adjustable hinge system 200 is utilized to couple the adjustable hinge system 200 to the base mirror assembly. Further, the adjustable hinge system 200 may include more or less components. In some applications, the adjustable hinge system 200 includes two mounting brackets 208, two mounting brackets 210, two hinge brackets 212, two coupling brackets 214, two coupling brackets 216, two coupling screws 218, two coupling screws 220, two pull screws 222, two pull screws 224, two tie down screws 226, two tie down screws 228, two hinge screws 230, two hinge screws 232, two jack screws 234, and two jack screws 236. In these applications, the second mounting bracket 208 and the second mounting bracket 210 are coupled to the adjustable mirror assembly 104, the second hinge bracket 212 is coupled to the housing 206, and the second coupling bracket 214, the second coupling bracket 216, the second coupling screw 218, the second coupling screw 220, the second pull screw 222, the second pull screw 224, the second tie down screw 226, the second tie down screw 228, the second hinge screw 230, the second hinge screw 232, the second jack screw 234, and the second jack screw 236 variously interact with the second mounting bracket 208, and the second mounting bracket 210, the second hinge bracket 212, and the housing 206 as previously described.

Further, in applications where the mirror system 100 includes three adjustable hinge systems 200 that are each coupled to the base mirror assembly 102 and the adjustable mirror assembly 104, or that are each coupled to base mirror assembly 102 and the adjustable mirror assembly 106, a middle one of the adjustable hinge systems 200 may include less components than the adjustable hinge system 200 shown in FIG. 2. These applications may exist where the adjustable mirror assembly 104 and/or the adjustable mirror assembly 106 is relatively large and/or heavy compared to the base mirror assembly 102. In these applications, the middle adjustable hinge system 200 may not include the coupling bracket 214, the coupling bracket 216, the coupling screw 218, the coupling screw 220, the pull screw 222, and the pull screw 224. In this way, cost and complexity of the mirror system 100 may be reduced in these applications.

It is also understood that where a first component is described as having a threaded aperture (e.g., the hinge bracket 212, etc.) and a second component is described as having a slot (e.g., the mounting bracket 208, the mounting bracket 210, etc.), that the second component may instead include the threaded aperture and the first component may instead include the slot.

According to various embodiments, the mirror system 100 incorporates lighting elements into at least one of the base mirror assembly 102, the adjustable mirror assembly 104, and the adjustable mirror assembly 106. In an exemplary embodiment, the adjustable mirror assembly 104 and the adjustable mirror assembly 106 each incorporate lighting elements. As a result, by using the adjustable hinge system 200, a user can selectively reposition light emitted from the lighting elements within the adjustable mirror assembly 104 and/or the adjustable mirror assembly 106.

Figure 3:
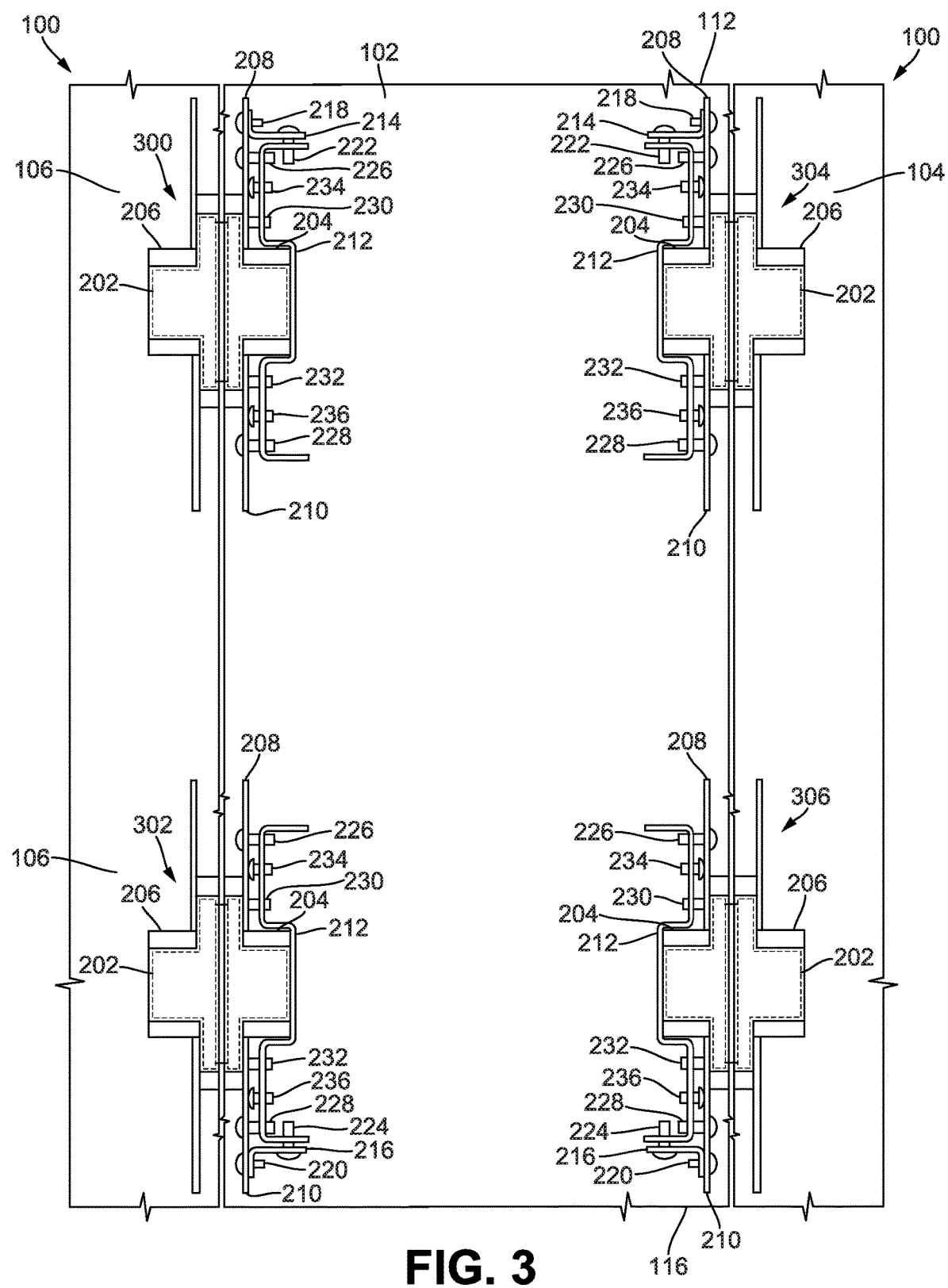
FIG. 3 is a front view of the mirror system shown in FIG. 1A, according to an exemplary embodiment of the present disclosure.

FIG. 3 illustrates the mirror system 100 including four adjustable hinge systems 200, each of which is separately labeled in FIG. 3. In FIG. 3, the rear cover 103, the rear cover 105, the rear cover 107, and the rear cover 109 are hidden (e.g., not shown, etc.) for illustrative purposes only. As shown in FIG. 3, the mirror system 100 includes a first top adjustable hinge system 300 and a first bottom adjustable hinge system 302 coupling a first adjustable mirror assembly 104 to the base mirror assembly 102 and a second top adjustable hinge system 304 and a second bottom adjustable hinge system 306 coupling a second adjustable mirror assembly 106 to the base mirror assembly 102. Each of the top adjustable hinge systems 200 includes only a single pull screw 222 and does not include the pull screw 224 or the coupling bracket 216 or coupling screw 220. Similarly, each of the bottom adjustable hinge systems 200 includes only a single pull screw 224 and does not include the pull screw 222 or the coupling bracket 214 or the coupling screw 218. To raise or lower one of the adjustable mirror assembly 104 and the adjustable mirror assembly 106, one of the pull screws 222 (e.g., the pull screw 222 of the first adjustable hinge system 200, the pull screw 222 of the third adjustable hinge system 200, etc.) is turned in one direction (e.g., clockwise, tightening direction, etc.) and one of the pull screws 224 of the associated adjustable hinge system (e.g., the second adjustable hinge system 200, the fourth adjustable hinge system 200, etc.) is turned in an opposite direction (e.g., counterclockwise, loosening direction, etc.). In this way, a user may adjust each of the adjustable mirror assembly 104 and the adjustable mirror assembly 106 relative to the base mirror assembly 102 without taking apart the mirror system 100 or removing the mirror system 100 from a wall.

Mirror system 100 may include a fifth adjustable hinge system 200, positioned between the first adjustable hinge system 200 and the second adjustable hinge system 200 and coupled to the base mirror assembly 102 and the adjustable mirror assembly 104, as well as a sixth adjustable hinge system 200, positioned between the third adjustable hinge system 200 and the fourth adjustable hinge system 200 and coupled to the base mirror assembly 102 and the adjustable mirror assembly 106. In such embodiments, the fifth adjustable hinge system 200 and the sixth adjustable hinge system 200 do not include the coupling screw 218, the coupling screw 220, the coupling bracket 214, the coupling bracket 216, the pull screw 222, or the pull screw 224. In this way, the fifth adjustable hinge system 200 and the sixth adjustable hinge system 200 provide support for the adjustable mirror assembly 104 and the adjustable mirror assembly 106 while being adjustable in vertical directions by the pull screw 222 and the pull screw 224 on other adjustable hinge systems 200 (e.g., the first adjustable hinge system 200, the second adjustable hinge system 200, the third adjustable hinge system 200, the fourth adjustable hinge system 200, etc.).

As utilized herein, the terms "approximately," "about," "parallel," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. It is understood that the term "parallel" is intended to encompass de minimus variations as would be understood to be within the scope of the disclosure by those of ordinary skill in the art.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments and that such variations are intended to be encompassed by the present disclosure.

The construction and arrangement of the elements of the mirror system 100, the adjustable hinge system 200, and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

What is claimed is:

1. A mirror system comprising:
a base mirror assembly; and
an adjustable mirror assembly coupled to the base mirror assembly, the adjustable mirror assembly comprising an adjustable hinge system that facilitates movement of the adjustable mirror assembly relative to the base mirror assembly, the adjustable hinge system comprising:
a first bracket coupled to the base mirror assembly;
a second bracket coupled to the first bracket;
a hinge coupled to the adjustable mirror assembly; and
a third bracket coupled to the hinge and the second bracket;
wherein the third bracket is coupled to the second bracket via a first screw such that the base mirror assembly is coupled to the adjustable mirror assembly;
wherein rotation of the first screw causes movement of the adjustable mirror assembly relative to the base mirror assembly; and
wherein the third bracket is coupled to a second screw and configured such that the second screw is capable of contacting the first bracket to cause movement of the adjustable mirror assembly relative to the base mirror assembly.

2. The mirror system of claim 1, wherein the first bracket is coupled to the third bracket via a third screw such that the adjustable mirror assembly is secured to the base mirror assembly.

3. The mirror system of claim 1, wherein:
the adjustable hinge system further comprises a fourth bracket coupled to the base mirror assembly independent of the second bracket or the third bracket; and
the fourth bracket is coupled to the third bracket independent of the first bracket or the second bracket.

4. The mirror system of claim 3, wherein the third bracket is coupled to a second screw independent of the first bracket or the second bracket and configured such that the second screw is capable of contacting the fourth bracket to cause movement of the adjustable mirror assembly relative to the base mirror assembly.

5. The mirror system of claim 4, wherein the third bracket is coupled to the fourth bracket via a third screw and independent of the first bracket or the second bracket.

6. A mirror system comprising:
a base mirror assembly; and
an adjustable mirror assembly coupled to the base mirror assembly, the adjustable mirror assembly comprising an adjustable hinge system that facilitates movement of the adjustable mirror assembly relative to the base mirror assembly, the adjustable hinge system comprising:
a first bracket coupled to the base mirror assembly;
a second bracket coupled to the first bracket;
a hinge coupled to the adjustable mirror assembly; and
a third bracket coupled to the hinge and the second bracket;
wherein the third bracket is coupled to the second bracket via a first screw such that the base mirror assembly is coupled to the adjustable mirror assembly;
wherein rotation of the first screw causes movement of the adjustable mirror assembly relative to the base mirror assembly; and
wherein the first bracket is coupled to the third bracket via a second screw such that the adjustable mirror assembly is secured to the base mirror assembly.

7. The mirror system of claim 6, wherein:
the first bracket comprises a first aperture receiving the second screw such that the second screw is repositionable along the first aperture; and
the first bracket is configured such that rotation of the first screw causes repositioning of the second screw along the first aperture.

8. The mirror system of claim 7, wherein the third bracket is coupled to a third screw and configured such that the third screw is capable of contacting the first bracket to cause movement of the adjustable mirror assembly relative to the base mirror assembly.

9. The mirror system of claim 8, wherein:
the first bracket comprises a second aperture; and
the third bracket is configured such that the third screw is capable of being aligned with the second aperture and configured such that the third screw is capable of contacting the first bracket proximate the second aperture.

10. A mirror system comprising:
a base mirror assembly; and
an adjustable mirror assembly configured to be coupled to the base mirror assembly, the adjustable mirror assembly comprising an adjustable hinge system configured to facilitate movement of the adjustable mirror assembly relative to the base mirror assembly, the adjustable hinge system comprising:
a first bracket configured to be coupled to the base mirror assembly;
a second bracket;
a hinge configured to be coupled to the adjustable mirror assembly; and
a third bracket configured to be coupled to the hinge and the second bracket;
wherein the third bracket is configured to be coupled to a first screw and configured such that the first screw is capable of contacting the first bracket to cause movement of the adjustable mirror assembly relative to the base mirror assembly; and
wherein the first bracket is configured to be coupled to the third bracket via a second screw such that the adjustable mirror assembly is secured to the base mirror assembly.

11. The mirror system of claim 10, wherein the first bracket is configured to be coupled to the third bracket via a second screw such that the adjustable mirror assembly is secured to the base mirror assembly.

12. The mirror system of claim 10, wherein:
the adjustable hinge system further comprises a fourth bracket coupled to the base mirror assembly independent of the second bracket or the third bracket; and
the fourth bracket is configured to be coupled to the third bracket independent of the first bracket or the second bracket.

13. The mirror system of claim 12, wherein the third bracket is configured to be coupled to a second screw independent of the first bracket or the second bracket and configured such that the second screw is capable of contacting the fourth bracket to cause movement of the adjustable mirror assembly relative to the base mirror assembly.

14. The mirror system of claim 13, wherein the third bracket is configured to be coupled to the fourth bracket via a third screw and independent of the first bracket or the second bracket.

15. The mirror system of claim 10, wherein:
the first bracket comprises a first aperture configured to receive the second screw such that the second screw is repositionable along the first aperture; and
the first bracket is configured such that rotation of the first screw causes repositioning of the second screw along the first aperture.

16. The mirror system of claim 15, wherein:
the first bracket comprises a second aperture; and
the third bracket is configured such that the first screw is capable of being aligned with the second aperture and configured such that the first screw is capable of contacting the first bracket proximate the second aperture.

17. A mirror system comprising:
a base mirror assembly; and
an adjustable mirror assembly configured to be coupled to the base mirror assembly, the adjustable mirror assembly comprising an adjustable hinge system configured to facilitate movement of the adjustable mirror assembly relative to the base mirror assembly, the adjustable hinge system comprising:
a first bracket configured to be coupled to the base mirror assembly;
a second bracket configured to be coupled to the first bracket;
a third bracket configured to be coupled to the base mirror assembly;
a hinge configured to be coupled to the adjustable mirror assembly; and
a fourth bracket configured to be coupled to the hinge and to at least one of the second bracket or the third bracket.

18. The mirror system of claim 17, wherein the second bracket is configured to facilitate movement of the adjustable mirror assembly relative to the base mirror assembly.

\* \* \* \* \*